United States Patent [19]

Carter

[11] 4,111,083

[45] Sep. 5, 1978

[54] TOOL HOLDER

[76] Inventor: Walter L. Carter, 17156 Los Alimos, Granada Hills, Calif. 91344

[21] Appl. No.: 822,752

[22] Filed: Aug. 8, 1977

[51] Int. Cl.² .......................... B23B 29/00; B26D 1/12
[52] U.S. Cl. ........................................ 82/36 A; 407/88
[58] Field of Search ...................... 82/36 R, 36 A, 37; 407/85, 88, 90, 108, 107, 112; 24/256, 257 R

[56] References Cited

U.S. PATENT DOCUMENTS

| 862,809 | 8/1907 | Conklin | 407/112 |
|---|---|---|---|
| 1,266,116 | 5/1918 | Gibbs | 82/36 R |
| 2,031,334 | 2/1936 | Severson | 407/108 |
| 2,081,677 | 5/1937 | O'Neil | 24/256 |
| 2,164,951 | 7/1939 | Schwartz | 24/257 R |
| 2,171,694 | 9/1939 | Harje | 407/85 |
| 2,908,963 | 10/1959 | Gollus | 407/107 |
| 3,043,173 | 7/1962 | Twamley et al. | 82/37 |
| 3,264,941 | 8/1966 | Miraglia | 82/36 A |
| 3,505,715 | 4/1970 | Germani | 407/108 |
| 3,765,065 | 10/1973 | Hay | 24/256 |
| 3,918,332 | 11/1975 | Lemanski | 82/36 R |
| 4,054,068 | 10/1977 | Carter | 82/36 R |

Primary Examiner—Harrison L. Hinson
Attorney, Agent, or Firm—Nilsson, Robbins, Dalgarn, Berliner, Carson & Wurst

[57] ABSTRACT

A tool holder adapted to be swivelly mounted on a lathe turret includes an open channel to horizontally support an elongated cutting tool projecting outwardly to operate on a rotating workpiece. Dowels are insertable in aligned holes vertically defined at predetermined locations through the tool holder. The placement of two pins in a desired alignment relative to a line of reference permits the adjustment of the tool holder upon the face of the turret to locate the tool horizontally at a selected angle with the workpiece. Snap rings are close fitted to the dowels so as to frictionally engage the dowel along its length, fixing the position of the dowels in the vertical holes. In a particular embodiment the lower surface of the tool channel is coplanar with the mounting surface of the tool holder. A shim can be inserted to raise the lower channel surface to accommodate the centerline requirements of lathes designed for larger diameter tools.

13 Claims, 8 Drawing Figures

TOOL HOLDER

BACKGROUND AND SUMMARY OF THE INVENTION

Metal shaping tools, such as cut-off and turning tools, which are mounted on a lathe turret or a similar tool carrier, are subjected to very strong distorting and deflecting forces, arising from the interaction of the cutting element and the metallic workpiece. The high speed demanded by lathe tool operations produces rapid vibrations which tend to change the accurate alignment of the tool's cutting edge and which make it difficult to reproducibly perform work at close tolerances. In particular there is a problem in setting tools at a specific angle to the workpiece after they have been removed for regrinding or sharpening. The release of screws to remove a tool bit for replacement is inefficient and time consuming. The positioning of tools by manual calibration is potentially affected by error on the part of the tool setter, and the provision of lateral guiding or supporting surfaces on the tool itself often introduces additional distortions by the uneven distribution of the hold of such devices, and the unequal pressure on the bearing surfaces. These drawbacks, singly or jointly, are especially onerous for low-cost, small-batch processing which requires fast set-ups without loss of accuracy. An additional problem relates to the much higher costs attendant the use of ½ inch cutting tools as compared to ⅜ tools, but misalignment occurs when one attempts to substitute ⅜ inch tools on a lathe designed for ½ inch tools.

The present invention is directed to resolve the various problems inherent in conventional designs by providing a tool holder for a metal cutting tool which permits the rapid and reproducibly accurate positioning of a tool relative to a rotating workpiece, and means for retaining the tool in the selected alignment therewith. Additionally, the tool holder is designed so as to use ⅜ inch tools but can be readily converted for a ½ inch lathe design when required.

The foregoing problems are overcome by the present invention directed to a tool holder for a lathe, releasably mounted on a lathe turret for linear and pivotable motion about a vertical bolt reclined in the confines of a vertical bore of oblong cross-section traversing the tool holder. The bolt has one of its ends engageable in a groove formed in the lathe turret and includes means for supporting a tool projecting outwardly from the tool holder to operate on a workpiece rotating about an axis. In accordance herewith, means are provided for releasably positioning the tool holder with respect to the turret including at least one pair of dowels, each dowel releasably inserted and depending from one of a plurality of aligned holes therefor vertically defined at predetermined locations through the tool holder. The angular orientation of the holes marked by the inserted dowels, relative to the rotation of the workpiece, defines a predetermined alignment of the tool holder on the turret.

More specifically, the cutting tool holder, according to the present invention, includes a massive, substantially block-like body which is vertically traversed by a bore of oblong, slot-like cross section. A T-bolt, passed through the bore, slidably fits at one of its ends into a T-shaped groove formed as a cross-slide on a lathe turret, as is well known in the art. At its opposite end, the T-bolt is secured against displacement by threaded means, tightened against the surface wall of the tool holder on both sides of the slot. A horizontally aligned, outwardly open recess on one of the vertical faces of the tool holder supports therein a portion of the shank of a cutting tool, which is firmly held in place therein by overhead screws admitted through vertical bores and bearing against the upper surface of the shank. In a cut-off tool holder formed in accordance with my copending application Ser. No. 681,971, filed Apr. 30, 1976, entitled "LATHE TOOL," the shank-supporting recess is formed by a shoulder in the face of the tool holder block, and a parallel shoulder in an overhead clamping lid which is pivotable about a hingepin. In another embodiment of the present invention the shank of a turning tool is supported, over a portion of its length, in an outwardly open, rectangular channel formed in the tool holder block.

A plurality of vertically extending, identical cylindrical holes are defined through the tool holder in two parallel rows, one on each side of the oblong bore slot. Locking pins, formed as dowels, with retaining snap rings, are releasably and slidingly received in the holes and protrude therefrom at at least one of their ends. The snap rings are adjustable and are removably mounted on the dowels to maintain them in a vertical position in the holes, and to prevent their displacement therefrom in the longitudinal direction.

In one embodiment of the present invention the holes in each row which are laterally equidistant from one another, are also equidistant from the opposite front and rear walls of the tool holder, so that the lines connecting pairs of transversely positioned holes are parallel to the respective walls. In another embodiment the two rows of holes are offset relative to one another by a predetermined distance, so that a line which connects, for example, the two holes at the ends of each row, describes an angle of less than 90° with respect to the direction of the front and rear walls of the tool holder. Two dowels, each inserted in one cavity in each row, serve to rapidly and easily denote a particular orientation of the tool holder relative to the turret. Since the tool holder may be advanced or retracted, as well as rotated about the bolt with respect to the turret, the multiplicity of holes and the variety of angular settings which can be achieved by the placement of the dowels permits a large number of different alignments of the tool holder adapted for specific operations. A cut-off tool, for instance, intended to approach a rotating workpiece at an angle of 90° relative to the axis of rotation, is advantageously held in a tool holder set at a 45° angle with respect to the lathe turet, whereas a turning tool, also intended to maintain a 90° approach angle, can satisfactorily perform if the tool holder is set at 90° to the axis of rotation of a workpiece.

Once the dowels have been put in place, they may be retained in the respective holes during removal, replacement or adjustment of the tool holder and/or the tool carrier thereon, so that subsequent operations may be carried out at precisely the same angle. Likewise, tool holders may be interchanged in response to different cutting jobs, different dimensions or surface characteristics of the workpiece or different lengths of the workpiece, without sacrificing the accuracy of any operation. In addition to their function as positioning means the dowels serve as stops, limiting the deviation of the tool holder from its pre-set alignment.

In regard to the aforementioned substitution of ⅜ inch tools for ½ inch tools, this is accommodated by designing the tool holder so that the lower surface of the tool retaining channel is coplanar with the mounting surface of the tool holder. A shim can be inserted to raise the lower channel surface sufficiently so that a ⅜ inch tool can be used on lathe turrets designed for ½ inch tools.

DETAILED DESCRIPTION

Figure 1:
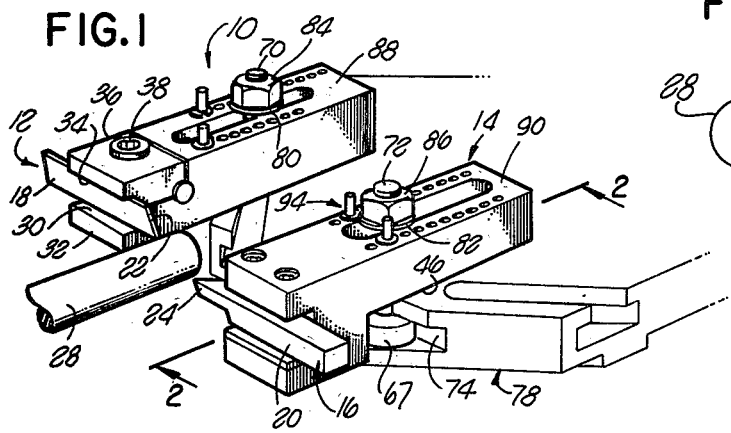
FIG. 1 is a perspective view of two tool holders, including cutting tools, constructed in accordance with the present invention.
Figure 3:
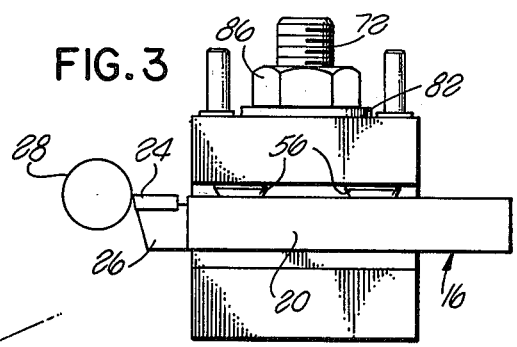
FIG. 3 is a front elevational view of the tool holder of FIG. 2.

Referring to FIG. 1, there is shown one type of tool holder 10 holding a cut-off tool 12, and another tool holder 14 holding a turning tool 16. The elongated tools 12 and 16 include shanks 18 and 20, respectively, of substantially rectangular cross section, with cutting blades 22 and 24, respectively, at one end of each shank. The blades 22 and 24 may be integral with the shanks 18 and 20. In the view of FIG. 3 the blade 24 is shown as a flat, thin element with a predetermined rake angle, inserted in a recess 26 provided in the shank 20.

A tubular workpiece 28 is centered between the tool holders 10 and 14 and is rotatable about an axis which is normal to the longitudinal axes of the shanks 18 and 20. The shape of the workpiece 28, and the handedness of the tools 12 and 16 is shown by way of example only, it being understood that solid or hollow workpieces of diverse cross-sectional shape may be substituted, and that each of the tools may be reversed to operate singly or jointly in right-handed or left handed modes.

The tool holders 10 and 14, constructed for easy storage and handling, each comprise a massive, substantially block-like body. The compactness of the design permits easy access to the tool bits and overcomes the drawbacks of prior art tool holders of L-shaped cross section interfering with one another on the lathe turret.

In the tool holder 10, a horizontal shoulder 30 extending inwardly of the vertical front wall 32, a corresponding, inwardly extending shoulder 34 formed on the underside of a clamping lid 36, and a portion of the front wall therebetween define an outwardly open recess which partially encloses the cut-off tool shank 18. The clamping lid 36, releasably affixed to the tool holder 10 by a bolt 38, is pivotable about a cylinder (not shown) which is disposed in juxtaposed, hollowed out portions of the tool holder block and the lid, parallel with the direction of the shank 18. Retaining heads 40 are attached to the opposite ends of the cylinder adjacent to the side walls 42, 44 of the tool block 10 and the corresponding side walls of the lid 36.

Figure 2:
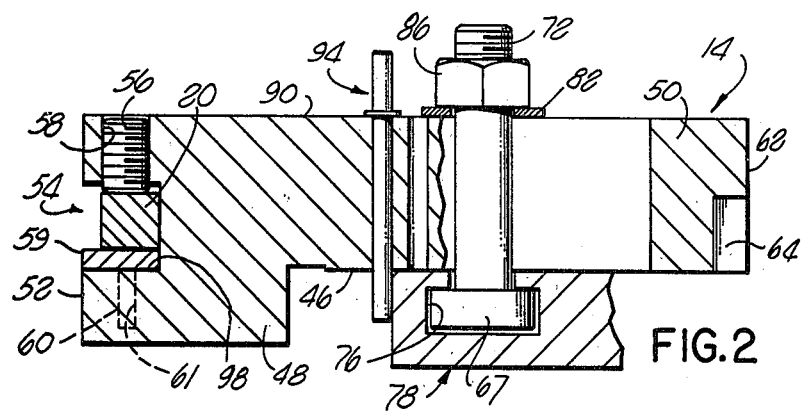
FIG. 2 is a longitudinal cross-sectional view of one of the tool holders of FIG. 1, taken along the line 2—2.
Figure 4:
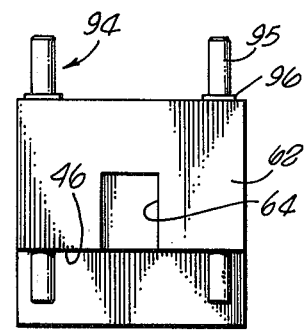
FIG. 4 is a rear elevational view of the tool holder of FIG. 2, without the T-bolts.

Referring additionally to FIGS. 2–4, the other tool holder 14 has, in its base wall, a mounting surface 46, setting off the front portion 48 from the rear portion 50 which is at an elevated level relative to the front. The vertical front wall 52 of the tool holder 14 includes a recess 54 of rectangular cross section for the support of the shank 20 over a portion of its length. A pair of socket set screws 56, threaded through vertical overhead bores 58, bear against the upper surface of the shank 20 to hold it firmly in place. An adjustment shim 59 may be disposed in the recess 54 to shift the centerline of the tool as described in more detail hereafter. The shim 59 includes a dependent retaining pin 60 which inserts into a hole 61 defined into the bottom front wall 52.

Referring specifically to FIG. 4, the vertical rear wall 62 of the tool holder 14 includes a cylindrical recess 64 serving to receive therein a hold-down clamp (not shown) to retain the tool holder in the grinding fixture during the manufacturing process.

Each of the tool holders 10 and 14 is traversed by a vertical bore 66, respectively, 68, of slot-like, oblong cross section. Threaded T-bolts 70 and 72, respectively, are disposed in the bores 66 and 68, each being anchored in a base such as 67 which is slidably engageable in a T-shaped groove 74, respectively 76, of a lathe turret generally denoted by the numeral 78. The opposite ends of the bolts 70 and 72 are engaged by washers 80 and 82, respectively, and superposed hexagonal nuts 84 and 86, respectively, which may be tightened against the surface walls 88 and 90, respectively, of the tool holders 10 and 14 on opposite sides of the bores 66, 68. In this embodiment the tool holders can be advanced, retracted and rotated with respect to the turret 78 around the respective bolts 70 and 72. As illustrated in FIG. 1, the tool holder 10 is offset from the tool holder 14 by an angle of 45°, and is pivoted about the bolt 70 so that the angle of approach of the cut-off tool blade 22 to the workpiece 28 is identical with the corresponding approach angle of the turning tool blade 24 thereto.

Figure 6:
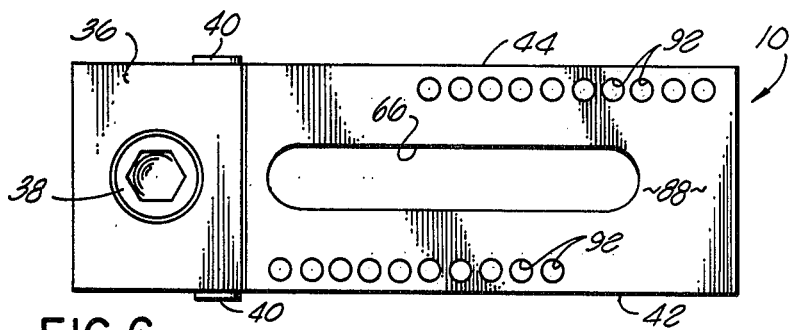
FIG. 6 is a top plan view of one of the tool holders shown in FIG. 1, without the T-bolts.
Figure 5A:
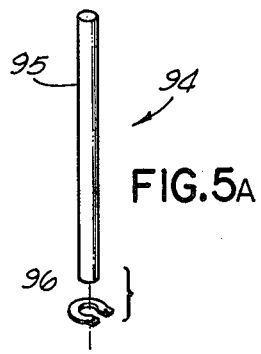
FIG. 5a is an exploded perspective view of a locking pin shown in FIGS. 1-4.
Figure 7:
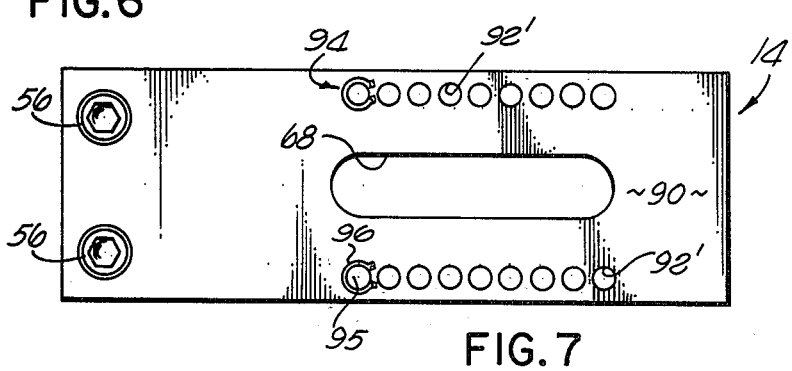
FIG. 7 is a top plan view of the other of the tool holders shown in FIG. 1, without the T-bolts.
Figure 5B:
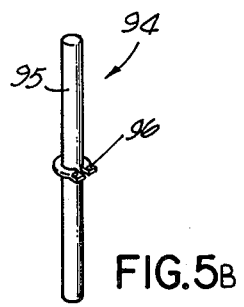
FIG. 5b is a perspective view of the locking pin of FIG. 5a, shown assembled.

Referring now additionally to FIGS. 5a, 5b, 6 and 7, in accordance with the invention, a plurality of identical, vertically aligned, cylindrical holes 92 and 92' are arrayed in two rows on opposite sides of the bores 66 and 68, respectively, the rows being parallel with one another and with the longitudinal axes of the oblong cross-sections of the respective bores. Each of the rows includes an identical number of laterally equidistant holes. In the illustration of FIG. 6, of the cut-off tool holder 10, the two rows, each containing ten holes 92, are shifted relative to one another, whereas FIG. 7 shows the turning tool holder 14 having two rows of nine holes 92' which are coterminous. In the embodiment of FIG. 6 each pair of coordinated holes 92 in the two rows at their respective ends can be joined by parallel lines which describe, with the longitudinal axis of the bore 66 an angle of 45°. In the embodiment of FIG. 7 all pairs of holes 92' which traversely confront each other, can be joined by parallel lines which are perpendicular to the longitudinal axis of the bore 68.

Locking pins 94 (FIGS. 5a and 5b), formed as dowels 95, are slidably insertable in the holes 92 and 92' so that they depend therefrom. The dowels 95 are maintained in vertical alignment in the holes and are prevented from longitudinal displacement therefrom by snap rings 96 which close fit the dowels 95 and can be frictionally slid thereon. The locking pins 94 are thus releasably mounted on the tool holder. In each of the tool holders, one pin 94 inserted in a hole 92 or 92' in one row, and another pin inserted in another hole in the opposite row, defines, with the axis of rotation of the workpiece 28 a specific angular attitude of the tool holder relative to the lathe turret. Locked in place by the snap rings 96, and abutting at their lower portions, protruding downwardly out of the holes 92 against juxtaposed vertical components of the turret enclosing the T-shaped grooves 74 or 76 (FIG. 2) the pins 94 serve simultaneously as positioning means and as stops and as a lock for the tool holders 10 and 14. Under this aspect, the offset distribution of the two rows of holes 92 in the cut-off tool holder of FIG. 6, and the angular alignment of the two pins therein, is intended to compensate for the greater amount of force exerted by a cut-off tool slicing through a workpiece at a predetermined angle, as compared to the force required for a turning tool, as illustrated in FIGS. 2, 3, 4 and 7, which only removes surface portions of a rotating workpiece.

In accordance with another embodiment, the dimensions of the tool holder is such as to permit a ⅜ inch tool to be used on centerline in a ½ inch lathe. Lathes are generally provided for use with either ½ inch tools or ⅜ inch tools but not both. The centerline of the spindle in the ½ inch lathe is located ½ inch above the top surface of the turret whereas the centerline of the spindle of the ⅜ inch lathe is located ⅜ inch above the top surface of the turret. Referring back to FIG. 2, the lower surface 98 of the recess 54 is formed to be coplanar with the bottom, mounting surface 46 of the tool holder. Without the shim 59 insertion of a ⅜ inch tool in the recess 54 places the cutting edge 24 (FIG. 1), located at the top of the tool, exactly ⅜ inch above the top of the turret and exactly at the centerline of the spindle of a ⅜ inch lathe.

When it is desired to use the tool holder and ⅜ inch tools in a ½ inch lathe, the shim 59 is inserted. The shim 59 has a thickness of exactly ⅛ inch and therefore raises the tool cutting edge 24 to be exactly ½ inch above the turret and exactly at the centerline of the spindle of a ½ inch lathe.

It will be appreciated that the invention as described heretofore may take forms that are different from the specific illustrative embodiments disclosed. Therefore, specific structural and functional details are not to be interpreted as necessarily limiting, but as a basis for the claims which define the scope of the invention.

I claim:

1. In a tool holder for a lathe, releasably mounted on a lathe turret for linear and pivotable motion about a vertical bolt received in the confines of a vertical bore of oblong cross-section traversing the tool holder, said bolt having one of its ends engageable in a groove formed in said lathe turret, said tool holder further comprising means for supporting a tool projecting outwardly therefrom to operate on a workpiece rotating about an axis, the improvement comprising
means for releasably positioning said tool holder with respect to said turret, said means including at least one pair of dowels, each dowel releasably inserted in, and depending from, one of a plurality of aligned, holes therefor vertically defined at predetermined locations through said tool holder, wherein the angular orientation of said holes marked by said inserted dowels, relative to the axis of rotation of said workpiece defines a predetermined alignment of said tool holder on said turret.

2. The improvement in accordance with claim 1 wherein said holes are arrayed in two rows, one on each side of said bore, in parallel alignment with one another.

3. The improvement in accordance with claim 2 wherein said rows are of equal length and include identical numbers of holes.

4. The improvement in accordance with claim 3 wherein the holes in each of said rows are equidistant from one another.

5. The improvement in accordance with claim 1 wherein said tool holder is a turning tool holder, and wherein said holes are arrayed in two coterminous rows, one on each side of said bore, in parallel alignment with one another.

6. The improvement in accordance with claim 1 wherein said tool holder is a cut-off tool holder, and wherein said holes are arrayed in two rows, one on each side of said bore, in parallel alignment with one another and laterally shifted with respect to each other by a predetermined distance.

7. The improvement in accordance with claim 1 wherein said dowels protrude out of the tops of said holes.

8. The improvement in accordance with claim 7 including means for releasably fixing the vertical position of said dowels.

9. The improvement in accordance with claim 8 wherein said fixing means comprises at least one snap ring close fit to said dowel so as to frictionally engage said dowel above said tool holder at a desired position, serving as a stop for said dowel.

10. The improvement in accordance with claim 8 wherein said fixing means are slidably and removably mounted on the protruding ends of said dowels.

11. The improvement in accordance with claim 1 wherein each dowel has an elongated cylindrical form and a snap ring close fit to said dowel so as to frictionally engage said dowel along its length.

12. The improvement in accordance with claim 1 wherein said tool holder has a planar bottom mounting surface portion adapted for releasably mounting on a lathe turret and formed with upper and lower surfaces spaced to define a recess for supporting a cutting tool projecting outwardly therefrom in a horizontal direction to operate on a workpiece rotating about an axis, the improvement wherein said lower surface is coplanar with the bottom mounting surface of said tool holder.

13. The improvement in accordance with claim 12 including a shim and means for securing said shim onto said lower surface to define a surface to support said cutting tool spaced vertically from the bottom surface of said tool holder.

* * * * *